(12) United States Patent
Goel et al.

(10) Patent No.: US 11,657,513 B2
(45) Date of Patent: May 23, 2023

(54) METHOD AND SYSTEM FOR GENERATING A TRI-MAP FOR IMAGE MATTING

(71) Applicant: SAMSUNG ELECTRONICS CO., LTD., Suwon-si (KR)

(72) Inventors: Avinav Goel, Bangalore (IN); Jagadeesh Kumar Malla, Bangalore (IN); Mahesh Putane Jagadeeshrao, Bangalore (IN); Manoj Kumar, Bangalore (IN); Pavan Sudheendra, Bangalore (IN); Tanushree Gupta, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 168 days.

(21) Appl. No.: 17/095,466

(22) Filed: Nov. 11, 2020

(65) Prior Publication Data

US 2021/0166400 A1    Jun. 3, 2021

(30) Foreign Application Priority Data

Nov. 29, 2019  (IN) .............................. 201941049053
Sep. 30, 2020  (IN) .............................. 201941049053

(51) Int. Cl.
*G06T 7/194*    (2017.01)
*G06T 7/11*     (2017.01)
*G06N 3/08*     (2023.01)
*G06T 7/155*    (2017.01)

(52) U.S. Cl.
CPC .............. *G06T 7/194* (2017.01); *G06N 3/08* (2013.01); *G06T 7/11* (2017.01); *G06T 7/155* (2017.01); *G06T 2207/20036* (2013.01); *G06T 2207/20081* (2013.01)

(58) Field of Classification Search
CPC ....................................................... G06N 3/08
See application file for complete search history.

(56) References Cited

U.S. PATENT DOCUMENTS 9,430,715 B1 *   8/2016   Wang ..................... G06T 5/008
9,569,855 B2     2/2017   Kim
(Continued)

OTHER PUBLICATIONS

Hu et al, "Instance Segmentation Based Semantic Matting for Compositing Applications", May 19, IEEE, p. 135-142 (Year: 2019).*

(Continued)

*Primary Examiner* — Edward Park
(74) *Attorney, Agent, or Firm* — Sughrue Mion, PLLC

(57) ABSTRACT

A system and a method of performing an image matting on an image are provided. The method includes detecting, by an image processing system, one or more objects in the image; determining, by the image processing system, a confidence map associated with the image using one or more image segmentation techniques for each of the one or more objects; and generating, by the image processing system, a tri-map for each of the one or more objects in the image from the confidence map based on at least one of a size of each of the one or more objects in the image and a distance between a first pixel in the image and a second pixel in at least one of the one or more objects in the image, wherein the tri-map is used to perform the image matting.

11 Claims, 11 Drawing Sheets

(56) References Cited

U.S. PATENT DOCUMENTS

| | | |
|---|---|---|
| 2012/0020554 A1* | 1/2012 | Sun .................... G06T 7/11 |
| | | 382/164 |
| 2015/0091900 A1 | 4/2015 | Yang et al. |
| 2015/0254868 A1 | 9/2015 | Srikanth et al. |
| 2016/0163041 A1 | 6/2016 | Talwar et al. |
| 2017/0273639 A1 | 9/2017 | Iscoe et al. |
| 2018/0240265 A1 | 8/2018 | Yang et al. |
| 2019/0037150 A1* | 1/2019 | Srikanth .......... H04N 5/232935 |
| 2019/0220983 A1 | 7/2019 | Price et al. |

OTHER PUBLICATIONS

Communication dated Feb. 24, 2021, issued by the International Searching Authority in counterpart International Application No. PCT/KR2020/016860 (PCT/ISA/210 and 237).

Hu et al., "Instance Segmentation based Semantic Matting for Compositing Applications," arXiv: 1904.05457v1, Apr. 10, 2019, Total 9 pages.

Communication dated Sep. 14, 2022 issued by the European Patent Office in European Application No. 20893842.3.

Wang, O., et al., "Automatic Natural Video Matting with Depth", 15th Pacific Conference on Computer Graphics and Applications, Oct. 29, 2007, pp. 469-472, XP031338482.

Xu, N., et al., "Deep Image Matting", 2017 IEEE Conference on Computer Vision and Pattern Recognition, Jul. 21, 2017, pp. 311-320, XP033249367.

* cited by examiner

METHOD AND SYSTEM FOR GENERATING A TRI-MAP FOR IMAGE MATTING

CROSS-REFERENCE TO RELATED APPLICATION(S)

This application is based on and claims priority under 35 U.S.C. § 119 to Indian Provisional Patent Application No. 201941049053, filed on Nov. 29, 2019, and Indian Patent Application No. 201941049053, filed on Sep. 30, 2020, in the Intellectual Property Office of India, the disclosures of which are incorporated by reference herein in their entireties.

BACKGROUND

1. Field

The disclosure relates to an image processing system and a method thereof, and more particularly, to a method and system for generating a tri-map for image matting.

2. Description of Related Art

Generally, in the field of image processing, a technique referred as image matting is used to accurately estimate the foreground object in images and videos. The estimated foreground object is extracted from the images and videos. Image matting is an important technique in image and video editing applications such as film production for creating visual effects, applying color pop to the background, masking or applying a blurring effect to the background, perspective zooming, combining two or more images and videos and the like. Image matting technique usually produces an "alpha matte" or a "matte" used to separate the foreground from the background in the images or videos. Further, image matting is different from image segmentation problem, where the image segmentation generates a binary image, in which a pixel in the image either belongs to the foreground or the background. However, image matting is different from the image segmentation, wherein some pixels may belong to foreground as well as background, such pixels are called unknown pixels or mixed pixels. Estimating the unknown pixels in the image is performed using a tri-map. Using the tri-map of the image or the video, the "alpha matte" is produced in image matting.

The existing methods for image matting or the current state of the art segmentation algorithms have limitations for bringing in finer boundary details in images including objects such as hair strands, fur clothes and the like. Further, the existing methods of image matting generally make use of a separate tri-map input or a user intervention to identify regions comprising the unknown pixels.

One of the existing techniques for human face matting makes use of face points and grab cut for automatic tri-map generation. Another existing technique on interactive image matting requires human interaction of bush stroke to mark unknown regions. However, these techniques either require too many inputs or require human intervention, thereby making the matte generation process complex and prone to human error. Therefore, there is a need to automatically generate fine grained alpha matte from the images or the videos without any user intervention.

The information provided above is only for enhancement of understanding of the general background of the disclosure and should not be taken as an acknowledgement or any form of suggestion that this information forms the prior art already known to a person skilled in the art.

SUMMARY

Additional aspects will be set forth in part in the description which follows, and in part, will be apparent from the description, or may be learned by practice of the presented embodiments.

According to an embodiment, there is provided a method of performing an image matting on an image, the method including: detecting, by an image processing system, one or more objects in the image; determining, by the image processing system, a confidence map associated with the image using one or more image segmentation techniques for each of the one or more objects; and generating, by the image processing system, a tri-map for each of the one or more objects in the image from the confidence map based on at least one of a size of each of the one or more objects in the image and a distance between a first pixel in the image and a second pixel in at least one of the one or more objects in the image, wherein the tri-map is used to perform the image matting.

The detecting the one or more objects in the image includes identifying the one or more objects in the image using one or more object detection techniques.

The determining the confidence map includes: computing the confidence map for the one or more objects in the image based on at least one of a pre-trained deep learning model, a depth sensor, or a Time of Flight (TOF) sensor; and modifying the confidence map using a color similarity based boundary correction technique.

The method further includes determining a transformation value for each of the one or more objects using a ratio of a size of the image to the size of each of the one or more objects in the image and a predetermined value, as inputs to a transformation function.

The generating the tri-map for each of the one or more objects in the image further includes: computing the distance from the first pixel in the image that is located outside the one or more objects to the second pixel in the at least one of the one or more objects in the image; comparing the distance with a transformation value corresponding to each of the one or more objects; and labelling the first pixel as an unknown pixel based on the distance being less than the transformation value; or labelling the first pixel as at least one of a foreground pixel or a background pixel using the confidence map based on the distance being greater than or equal to the transformation value.

The performing the image matting includes: providing the image and the tri-map of the image to a first pre-trained deep learning model; and generating an alpha matte of the image, wherein a foreground and a background in the image is separated using the alpha matte.

According to an embodiment, there is provided an image processing system for performing an image matting on an image, the image processing system includes: a memory; and a processor configured to: detect one or more objects in the image; determine a confidence map associated with the image using one or more image segmentation techniques for each of the one or more objects; and generate a tri-map for each of the one or more objects in the image from the confidence map based on at least one of a size of each of the one or more objects in the image and a distance between a first pixel in the image and a second pixel in at least one of the one or more objects in the image, wherein the tri-map is used to perform the image matting.

The processor is further configured to identify the one or more objects in the image using one or more object detection techniques.

The processor is further configured to: compute the confidence map for the one or more objects in the image based on at least one of a pre-trained deep learning model, a depth sensor, or a Time of Flight (TOF) sensor; and modify the confidence map using a color similarity based boundary correction technique.

The processor is further configured to determine a transformation value for each of the one or more objects using a ratio of a size of the image to the size of each of the one or more objects in the image and a predetermined value, as inputs to a transformation function.

The processor is further configured to: compute the distance from the first pixel in the image that is located outside the one or more objects to the second pixel in the at least one of the one or more objects in the image; compare the distance with a transformation value corresponding to each of the one or more objects; and labelling the first pixel as an unknown pixel based on the distance being less than the transformation value; or labelling the first pixel as at least one of a foreground pixel or a background pixel using the confidence map based on the distance being greater than or equal to the transformation value.

The processor is further configured to: provide the image and the tri-map of the image to a first pre-trained deep learning model; and generate an alpha matte of the image, wherein a foreground and a background in the image is separated using the alpha matte.

According to an embodiment, there is provided a method of performing an image matting on an image, the method includes: detecting, by an image processing system, one or more objects in the image; providing, by the image processing system, the image and the one or more objects in the image to a second pre-trained deep learning model to generate a tri-map for each of the one or more objects in the image, the second pre-trained deep learning model generating the tri-map based on at least one of a size of the image and a size of each of the one or more objects in the image; and performing, by the image processing system, the image matting on the image using the tri-map of the image.

The method further includes training the second pre-trained deep learning model, wherein the training the second pre-trained deep learning model includes: providing one or more sample images as an input to an initial deep learning model, wherein the initial deep learning model is based on an encoder-decoder model with skip connections; computing a loss value for the each pixel in the one or more sample images based on an output of the initial deep learning model using a loss function, wherein the output indicates a label for the each pixel in the sample image; aggregating the loss value based on the label associated with the each pixel in the one or more sample images, wherein the label includes one of a foreground pixel, a background pixel, or an unknown pixel; and modifying one or more weights of the initial deep learning model using a supervised learning technique based on the aggregated loss value.

The second pixel in the at least one of the one or more objects in the image is determined based on a bounding box applied to each of the one or more objects in the image, and wherein the second pixel is located at a center of the bounding box.

The generating the tri-map for each of the one or more objects in the image comprises generating the tri-map using morphological operations, and wherein kernel size of the morphological operations are determined based on a ratio of a size of the image to the size of each of the one or more objects in the image.

The one or more object detection techniques includes at least one of a bounding box technique using machine learning based viola-jones object detection framework using haar features, a scale-invariant feature transform (SIFT), a histogram of oriented gradient (HOG) features, a deep learning based region proposal, a single-shot refinement neural network for object detection, or a single-shot multi-box detector.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
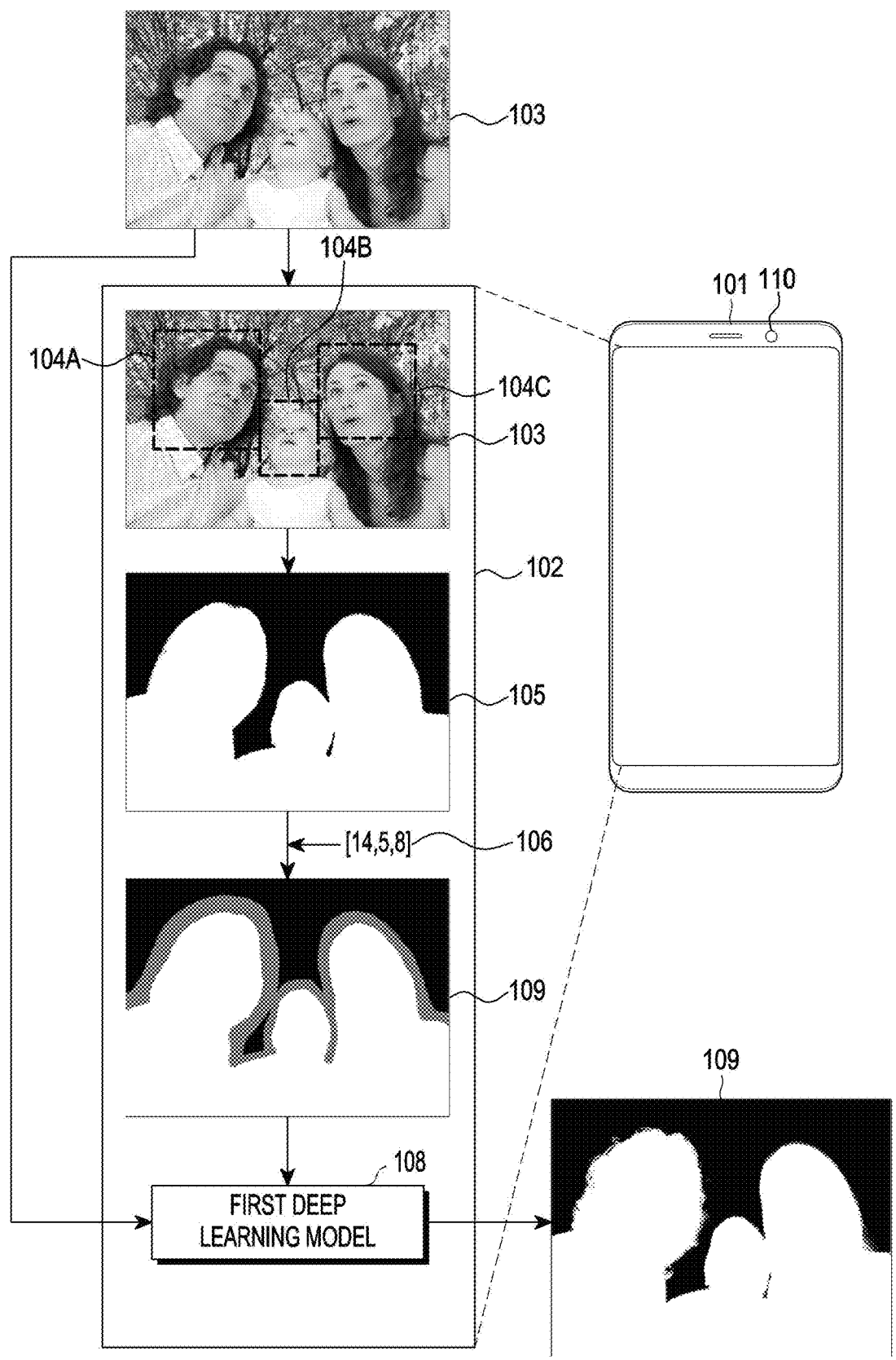
FIG. 1 illustrates an exemplary environment for generating a tri-map for image matting according to an embodiment.

In the disclosure, the term "exemplary" is used herein to mean "serving as an example, instance, or illustration." Any embodiment or implementation of the disclosure described as "exemplary" should not be construed as preferred or advantageous over other embodiments.

While the embodiments of disclosure are susceptible to various modifications and alternative forms, a specific embodiment thereof is shown by way of an example in the drawings, which will be described in detail below. It should be understood, however that the embodiments disclosed herein are not intended to limit the scope of the disclosure, but the disclosure should be construed as covering all modifications, equivalents, and alternatives within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following description of the embodiments, reference is made to the accompanying drawings that form a part hereof, and in which are shown by way of specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure.

FIG. 1 shows an exemplary environment for generating a tri-map for image matting according to an embodiment.

The disclosure relates to a method of generating a tri-map (107) to perform an image matting. The image matting technique generates an "alpha matte" (109). The alpha matte (109) is used to separate a foreground from a background in an image (103) or a video. The image (103) or the video may be an RGB image, or an RGB video, a CMYK image, or a CMYK video and the like. In the image (103), the foreground indicates a portion of the image (103) that is closer to a camera (110) used to capture the image (103), the background indicates a portion of the image (103) that is far away from the camera (110) used to capture the image (103). For example, three people in the image (103) may be included in the foreground and the trees in the image (103) may be included the background. Further, an image processing system (102) is used to perform image matting. The image processing system (102) may be implemented in at least one of a user device such as a smartphone (101) as shown in FIG. 1, a smartwatch, a laptop, a desktop computer, a server, a tablet computer and the like. The image processing system (102) may perform image matting on the image (103) or the video in real-time. The image processing system (102) receives the image (103) from an image capturing device such as the camera (110) or from a storage medium. The image processing system (102) detects one or more objects (104A, 104B, 104C collectively denoted as "104") in the image (103). The one or more objects (104) are indicative of the portion of the image (103) to be identified as the foreground in the image (103). For example, the one or more objects (104) may include at least one of one or more persons, one or more animals, one or more articles, one or more animated characters, one or more vehicles, and the like. The image processing system (102) detects the one or more objects (104) in the image (103) using one or more object detection techniques. For example, the one or more object detection techniques may include machine learning-based viola-jones object detection framework using haar features, a scale-invariant feature transform (SIFT), histogram of oriented gradients (HOG) features, and deep learning based region proposals, single-shot refinement neural network for object detection, single-shot multi-box detector and the like. For example, the image processing system (102) detects the faces of the three people as the one or more objects (104) in the image (103) as shown in FIG. 1. In one embodiment, the image processing system (102) may receive a user input to indicate the one or more objects (104) in the image (103).

Further, the image processing system (102) determines a confidence map (105) associated with the image (103) using one or more image segmentation techniques for each of the one or more objects (104) in the image (103). The one or more image segmentation techniques may include at least one of a pre-trained deep learning model, a depth sensor, and a Time of Flight (TOF) sensor. The confidence map (105) is indicative of a probability of a pixel belonging to a foreground or a background in the image (103).

In an embodiment, the image processing system (102) computes a transformation value (106) for each of the one or more objects (104) using a transformation function. Here, at least one of a size of the image (103) and/or a size of each of the one or more objects (104) in the image (103) may be provided as inputs to the transformation function. The transformation function may include at least one of linear transformation function or a non-linear transformation function. For example, the transformation function may be hyperbolic tangent function (tan h), sigmoid, exponential, Gaussian and the like. The transformation value (106) is computed to be directly proportional to the size of each of the one or more objects (104) in the image (103). For example, for three people in the image (103), the transformation value (106) may be 14 for a first object (104A), 5 for a second object (104B), 8 for the third object (104C).

In an embodiment, after computing the transformation value (106), the image processing system (102) generates a tri-map (107) for each of the one or more objects (104) in the image (103) as shown in FIG. 1. The tri-map (107) is generated from the confidence map (105) based on a distance between each pixel in the image (103) and each of the one or more objects (104) in the image (103), and the transformation value (106) corresponding to each of the one or more objects (104). The tri-map (107) of the image (103) is indicative of a definite background (i.e., black color), a definite foreground (i.e., white color) and an unknown region (i.e., grey color). In an embodiment, the image processing system (102) may generate the tri-map (107) using a pre-trained second deep learning model based on the image (103) and the one or more objects (104) in the image (103). The second deep learning model may be pre-trained to learn the determination of the confidence map (105), computation of the transformation value (106), and the generation of the tri-map (107) for the image (103). In an embodiment, the image processing system (102) generates the tri-map (107) using morphological operations, and the kernel size of the morphological operations are determined based on a ratio of the size of the image (103) to the size of each of the one or more objects (104) in the image (103) (e.g., the face scale).

Further, the tri-map (107) and the image (103) is provided as the input to a first deep learning model for performing the image matting for the image (103). For example, the first deep learning model may be an encoder-decoder based neural network. The first deep learning model generates an output including the alpha matte (109) for the image (103) as shown in FIG. 1. Using the alpha matte (109), the foreground and the background may be separated from each other in the image (103).

Figure 2:
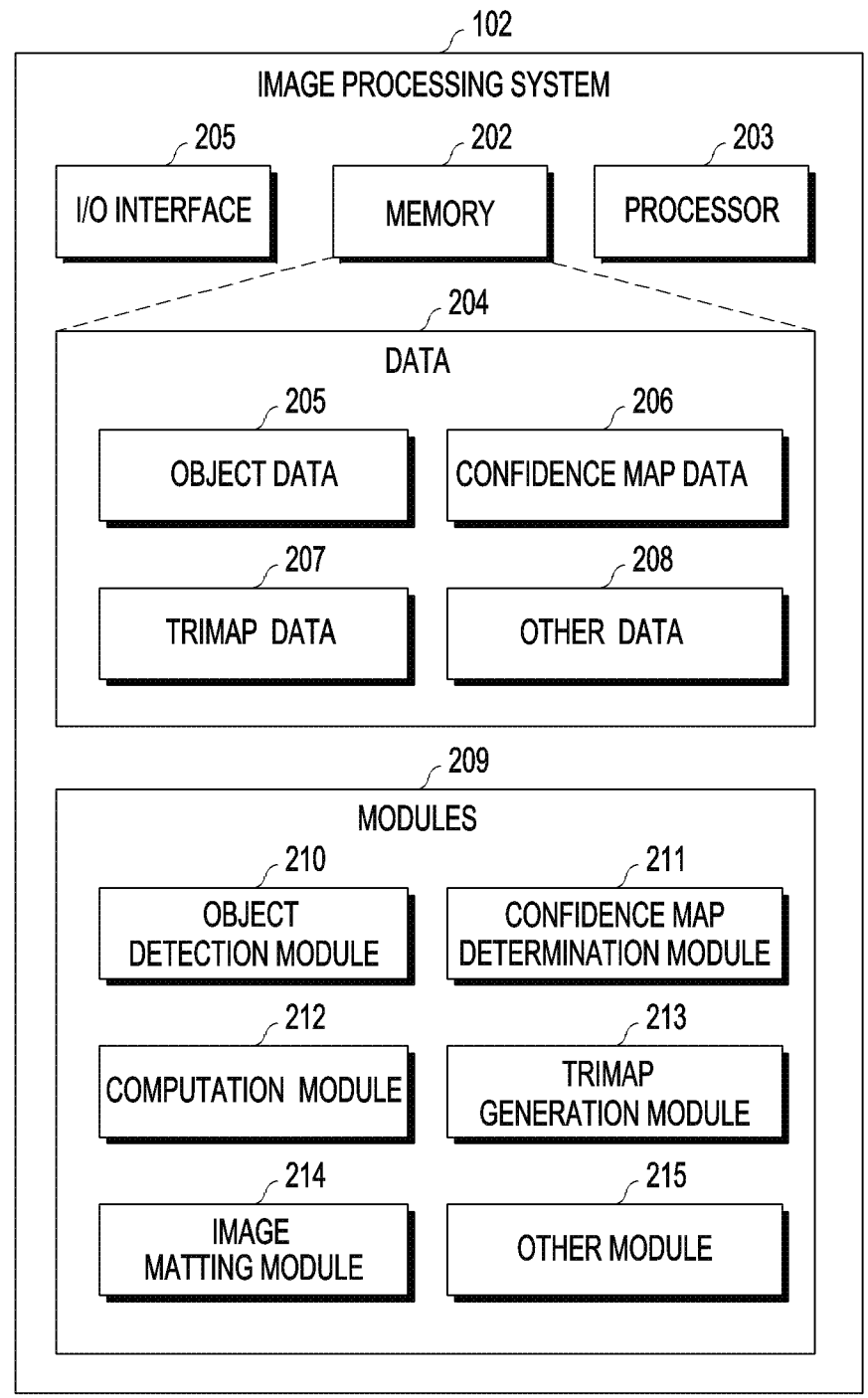
FIG. 2 shows a detailed block diagram of an image processing system according to an embodiment.

FIG. 2 shows a detailed block diagram of an image processing system (102) according to an embodiment.

The image processing system (102) may include a Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The image processing system (102) further includes an Input/Output (I/O) interface (201). The I/O interface (201) may be coupled with the processor (203) through which an input signal or/and an output signal may be communicated. In one embodiment, the image processing system (102) may receive the image (103) and the user input through the I/O interface (201).

In some implementations, the image processing system (102) may include data (204) and modules (209) as shown in FIG. 2. As an example, the data (204) and modules (209) may be stored in the memory (202) of the image processing system (102). At least one module from a plurality of modules (209) may be implemented through an Artificial Intelligence (AI) model. The memory (202) may be a non-volatile memory, a volatile memory, and a function associated with AI may be performed through the non-volatile memory, the volatile memory, and the processor (203).

Further, the processor (203) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, the learning means that, by applying a learning algorithm to a plurality of learning data, a predefined operating rule or AI model of a desired characteristic is generated. The learning may be performed in a device in which AI according to an embodiment is performed, and/or may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

In one embodiment, the data (204) may include, for example, an object data (205), a confidence map data (206), a tri-map data (207) and other data (208). The data (204) are described herein in detail.

In an embodiment, the object data (205) includes the one or more objects (104) detected in the image (103). In an embodiment, the one or more pixel values and coordinates of the one or more pixels associated with each of the one or more objects (104) may be stored in the object data (205).

In another embodiment, the object data (205) may include the coordinates of a bounding box associated with each of the one or more objects (104) in the image (103). For example, the bounding box may have a shape of a square, a rectangle, a circle encompassing each of the one or more objects (104).

In an embodiment, a confidence map data (206) includes the confidence map (105) determined for each of the one or more objects (104) in the image (103). The confidence map (105) is indicative of the probability of the pixel belonging to a foreground or a background in the image (103).

In an embodiment, a tri-map data (207) includes the tri-map (107) generated for the image (103). The tri-map (107) segments the image (103) into 3 categories, i.e., the definite foreground, the definite background, and the unknown region. The definite foreground is denoted by the pixels of white color, the definite background is denoted by the pixels of black color, and the unknown region is denoted by the pixels of grey color.

In an embodiment, other data (208) may include the transformation value (106) associated with each of the one or more objects (104) in the image (103), the alpha matte (109) of the image (103), the first deep learning model, a second deep learning model and the like.

In some embodiments, the data (204) may be stored in the memory (202) in form of various data structures. Additionally, the data (204) may be organized using data models, such as relational or hierarchical data models. The other data (208) may store data, including temporary data and temporary files, generated by the modules (209) for performing the various functions of the image processing system (102). Further, in an embodiment, the memory (202) may include at least one of a Static Random-Access Memory (SRAM), Dynamic Random-Access Memory (DRAM), a global buffer and the like.

In some embodiments, the data (204) stored in the memory (202) may be processed by the modules (209) of the image processing system (102). The modules (209) may be stored within the memory (202) that is communicatively coupled to the processor (203) or may be stored outside the memory (202) as shown in FIG. 2. As used herein, the term modules (209) may refer to an Application Specific Integrated Circuit (ASIC), a Field Programmable Gate Array (FPGA), an electronic circuit, a processor (203) (shared, dedicated, or group) and the memory (202) that execute one or more software or firmware programs, a combinational logic circuit, and/or other suitable components that provide the described functionality. In some other embodiments, the modules (209) may be implemented using at least one of ASICs or FPGAs.

In one implementation, the modules (209) may include, for example, an object detection module (210), a confidence map determination module (211), a computation module (212), a tri-map generation module (213), an image matting module (214) and other module (215). It may be appreciated that such aforementioned modules (209) may be represented as a single module or a combination of different modules.

In an embodiment, the object detection module (210) is used to detect the one or more objects (104) in the image (103). The one or more objects (104) in the image (103) is detected by identifying the one or more objects (104) in the image (103) using one or more object detection techniques. For example, the one or more object detection techniques may include machine learning based viola-jones object detection framework using haar features, a scale-invariant feature transform (SIFT), histogram of oriented gradients (HOG) features, and deep learning based region proposals, single-shot refinement neural network for object detection, single shot multi-box detector and the like.

In an embodiment, the confidence map determination module (211) is used to determine the confidence map (105) associated with the image (103) using one or more image segmentation techniques for each of the one or more objects (104). The confidence map determination module (211) computes the confidence map (105) for the one or more objects (104) in the image (103) based on at least one of a pre-trained deep learning model, a depth sensor, or a Time of Flight (TOF) sensor. Further, the confidence map determination module (211) modifies the confidence map (105) using a color similarity based boundary correction technique.

In an embodiment, the computation module (212) compute a transformation value (106) for each of the one or more objects (104) using a transformation function. The computation module (212) determines the transformation value (106) for each of the one or more objects (104) using a ratio of the size of the image (103) to the size of each of the one or more objects (104) in the image (103) and a predetermined value as the inputs to the transformation function. The transformation function may include at least one of a linear transformation function or a non-linear transformation function.

In an embodiment, the tri-map generation module (213) is used to generate the tri-map (107) for each of the one or more objects (104) in the image (103). The tri-map generation module (213) computes the distance from a pixel in the image (103) to each of the one or more objects (104) in the image (103). Further, compares the distance with the transformation value (106) corresponding to each of the one or more objects (104). Furthermore, the tri-map generation module (213) labels the pixel as the unknown pixel when the distance is less than the transformation value (106). Alternatively, it labels the pixel as at least one of a foreground pixel or a background pixel using the confidence map (105) when the distance is greater than or equal to the transformation value (106).

In an embodiment, the image matting module (214) is used to perform the image matting for the image (103). The image matting module (214) provides the image (103) and the tri-map (107) of the image (103) to the pre-trained first deep learning model. Further, the image matting module (214) generates the alpha matte (109) of the image (103) based on the output of the pre-trained first deep learning model. The foreground and the background in the image (103) are separated using the alpha matte (109).

In an embodiment, the other module (215) is used to generate the tri-map (107) using the pre-trained second deep learning model.

Figure 3:
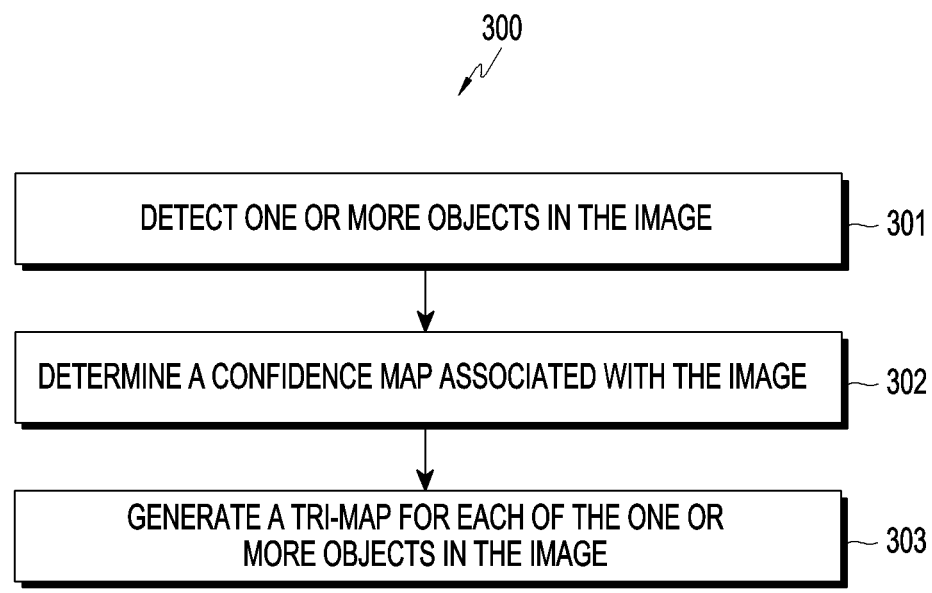
FIG. 3 shows a flowchart illustrating method steps for generating a tri-map for image matting based on a transformation value and confidence map according to an embodiment.

FIG. 3 shows a flowchart illustrating method of performing an image matting for an image (103) according to an embodiment.

The order or sequence of the method 300 shown in FIG. 3 should not be construed as a limitation, and the method 300 may be arranged in any order and any number of the described method blocks may be combined. Additionally, individual blocks may be deleted from the methods without departing from the scope of the disclosure. Furthermore, the method may be implemented in any suitable hardware, software, firmware, or any combination thereof.

At operation 301, the image processing system (102) detects the one or more objects (104) in the image (103).

Figure 4A:
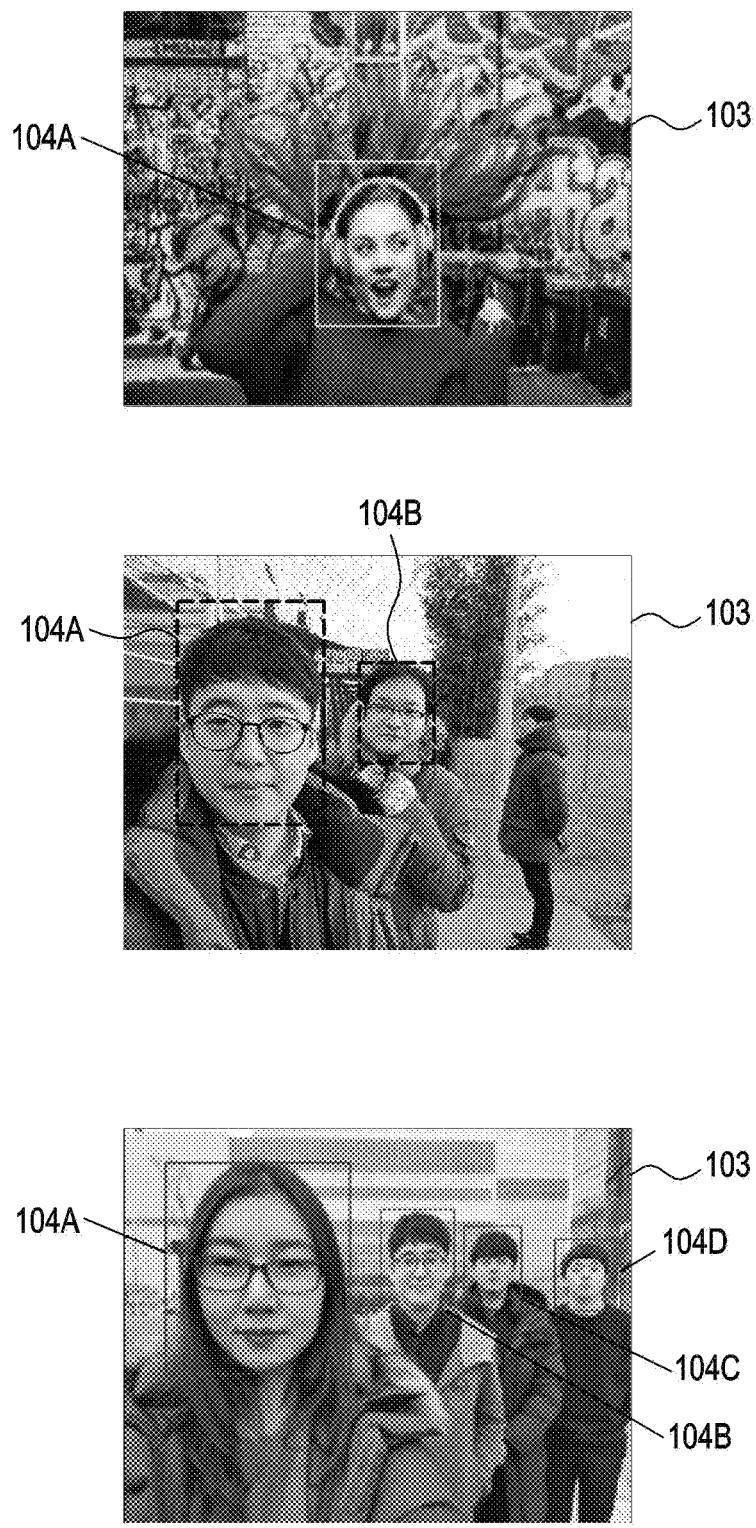
FIG. 4A shows an exemplary detection of one or more objects in an image according to an embodiment.

In an embodiment, detecting the one or more objects (104) in the image (103) includes identifying the one or more objects (104) in the image (103) using one or more object detection techniques. The one or more object detection techniques may include bounding box techniques using machine learning based viola-jones object detection framework using haar features, a scale-invariant feature transform (SIFT), histogram of oriented gradients (HOG) features, and deep learning based region proposals, single-shot refinement neural network for object detection, single shot multi-box detector and the like. The one or more objects (104) may include at least one of one or more persons, one or more faces, one or more animals, one or more articles, one or more animated characters, one or more vehicles, one or more buildings and the like. For example, faces of the one or more persons detected as the one or more objects (104) the image (103) is shown in FIG. 4A.

At operation 302, the image processing system (102) determines the confidence map (105) associated with the image (103) using one or more image segmentation techniques for each of the one or more objects (104).

Figure 4B:
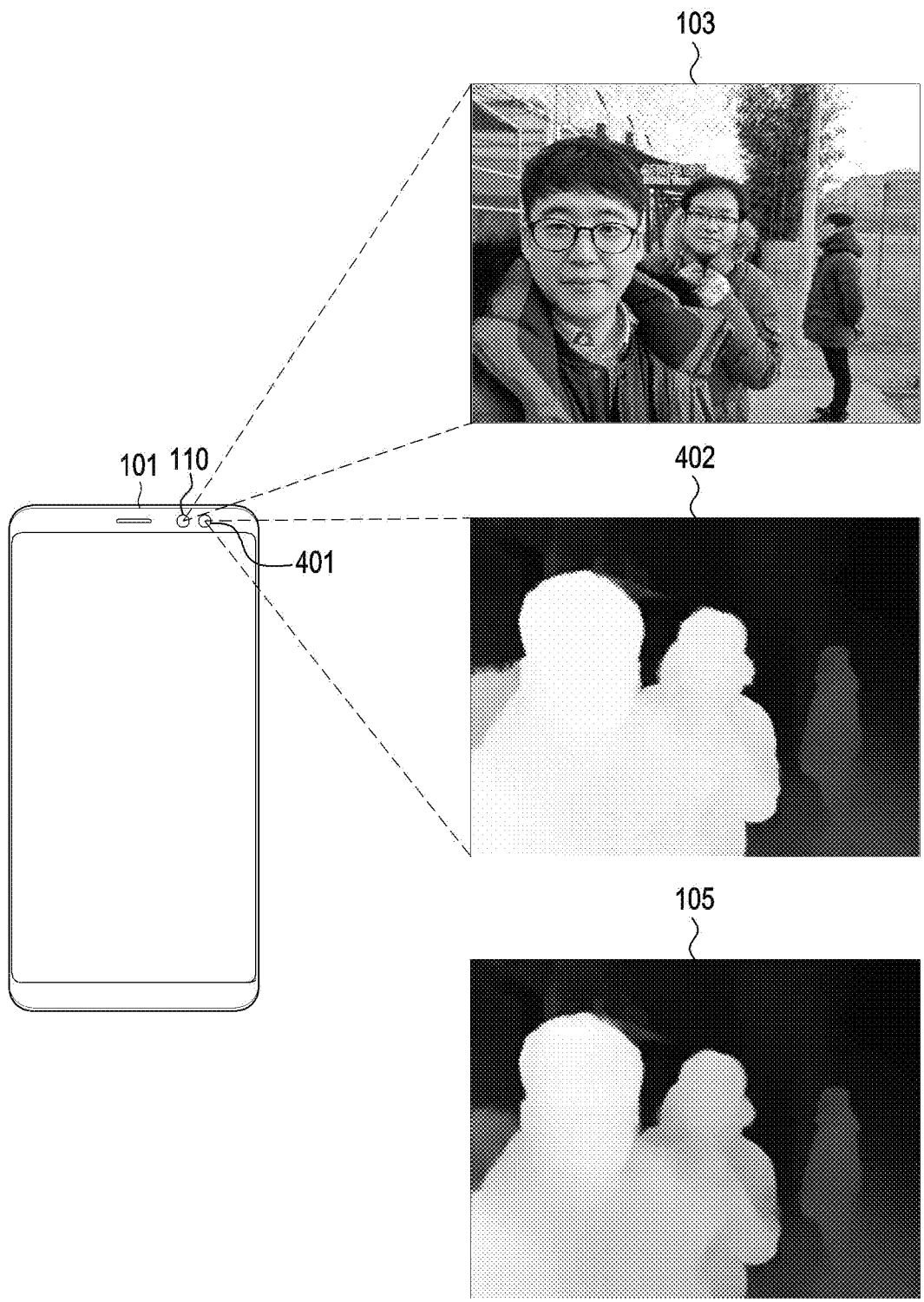
FIG. 4B shows an exemplary determination of confidence map using a depth sensor according to an embodiment.
Figure 4C:
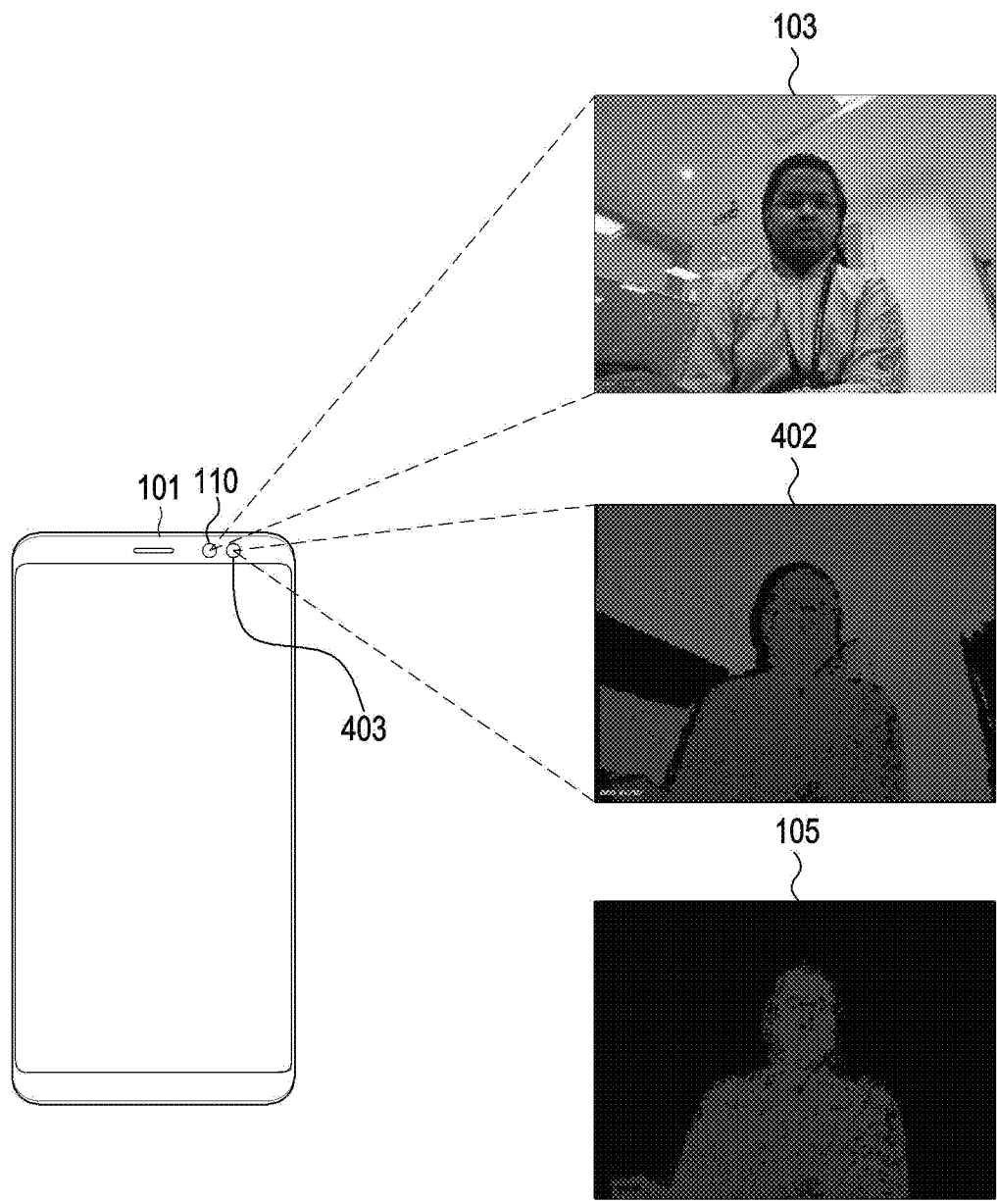
FIG. 4C shows an exemplary determination of confidence map using a Time of Flight sensor according to an embodiment.
Figure 4D:
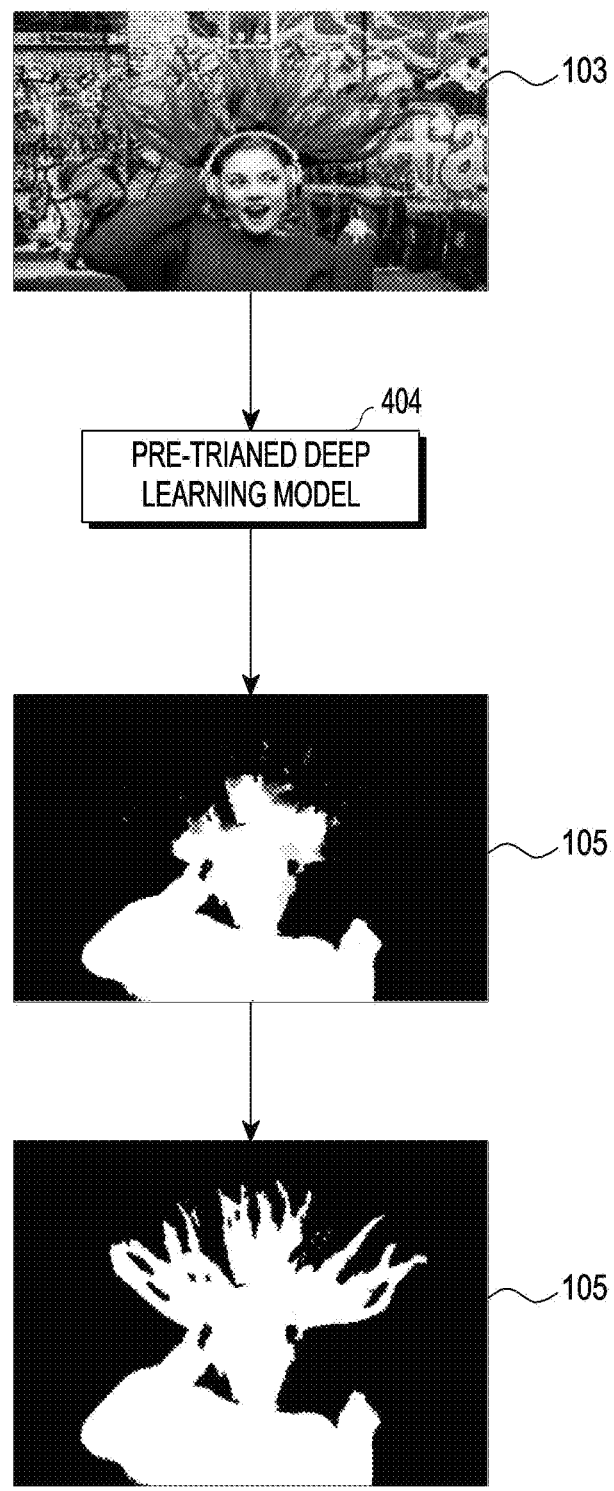
FIG. 4D shows an exemplary determination of confidence map using a pre-trained deep learning model and modification of confidence map using a color similarity based boundary correction technique according to an embodiment.
Figure 4E:
FIG. 4E shows an exemplary tri-map generated for an image according to an embodiment.

In an embodiment, the image processing system (102) determines the confidence map (105) by computing the one or more objects (104) in the image (103) based on at least one of the pre-trained deep learning model using the depth sensor, or the Time of Flight (TOF) sensor. The confidence map (105) is indicative of the probability of the pixel belonging to a foreground or a background in the image (103). In an embodiment, the user may select at least one object from the one or more objects (104) for generating the confidence map (105). Specifically, the depth sensor (401) is used to generate a depth map (402) for the image (103) captured by the camera (110) as shown in FIG. 4B. The image processing system (102) uses the detected one or more objects (104) to generate the confidence map (105) based a depth of the one or more objects (104) in the image (103) using the depth map (402) as shown in FIG. 4B. In another embodiment, the TOF sensor (403) may be used to generate the depth map (402) for the image (103) captured by the camera (110) as shown in FIG. 4C. The image processing system (102) uses the detected one or more objects (104) to generate the confidence map (105) based a depth of the one or more objects (104) in the image (103) using the depth map (402) as shown in FIG. 4C. In yet another embodiment, image processing system (102) uses the pre-trained deep learning model to determine the confidence map (105) for the image (103) as shown in FIG. 4D. Further, the image processing system (102) modifies the confidence map (105) using a color similarity based boundary correction technique as shown in FIG. 4E. In addition, one or more image enhancement techniques may be based on a histogram, a wavelet transform, gradient information, a watershed-based depth map, a region-based mean averaging of color for performing the color similarity based boundary correction in the image (103).

In an embodiment, after the generation of the confidence map (105), the image processing system (102) computes the transformation value (106) for each of the one or more objects (104) using the transformation function, where at least one of the size of the image (103) and the size of each of the one or more objects (104) in the image (103) are provided as inputs to the transformation function.

In an embodiment, the image processing system (102) computes the transformation value (106) by determining the transformation value (106) for each of the one or more objects (104) using the ratio of the size of the image (103) to the size of each of the one or more objects (104) in the image (103) and the predetermined value as the inputs to the transformation function. In an embodiment, the predetermined value may be 31, 51, and the like. However, the predetermined value is not limited thereto. The image processing system (102) may receive the predetermined value as the user input. The transformation value (106) is directly proportional to the ratio of the size of the one or more objects (104) in the image (103) and the size of the image (103). For example, the transformation value (106) may be computed using the equation below:

$$\text{Transformation value (106)} = \left(\tanh^{-1}\left(\frac{(\text{width}\times\text{height}) \text{of an object in the image}}{(\text{width}\times\text{height}) \text{of the image}}\times 2 - 1\right)\div 4 + 0.5\right)\times(\text{predetermined value} + 1) \quad \text{Equation (1)}$$

For example, the transformation value (106) may be a value such as 5, 12, 17, 35, and the like. The transformation value (106) is computed for each object from the one or more objects (104) in the image (103).

At operation 303, the image processing system (102) generates the tri-map (107) for each of the one or more objects (104) in the image (103) from the confidence map (105) based on at least one of a size of each of the one or more objects (104) in the image (103) and the distance between each pixel in the image (103) and each of the one or more objects (104) in the image (103). Here, the tri-map (107) is used to perform the image matting.

In an embodiment, the image processing system (102) generates tri-map (107) for each of the one or more objects (104) in the image (103) by computing the distance from a pixel in the image (103) to each of the one or more objects (104) in the image (103). The distance is computed for the each pixel in the image (103). The distance may be computed using a Euclidean distance technique. For example, a pixel situated at the center of the bounding box applied to each of the one or more objects (104) in the image (103) is used to compute a distance to each of the pixel outside the bounding box. Further, the image processing system (102) may compare the distance of the each pixel with the transformation value (106) corresponding to each of the one or more objects (104) and label each of the pixel as the unknown pixel when the distance between a pixel located at the center of the bounding box and a pixel outside the bounding box is less than the transformation value (106). For example, if the distance between a pixel located at the center of the bounding box and a pixel outside the bounding box is 7 and the transformation value (106) is 12, then the pixel is labelled as the unknown pixel. The unknown pixels in the tri-map (107) form the unknown region. Alternatively, the image processing system (102) labels each of the pixel as at least one of the foreground pixel or the background pixel using the confidence map (105) when the distance between a pixel located at the center of the bounding box and a pixel outside the bounding box is greater than or equal to the transformation value (106). For example, if the distance between a pixel located at the center of the bounding box and a pixel outside the bounding box is 22 and the transformation value (106) is 9, then the pixel is labelled as one of the foreground pixel or the background pixel using the confidence map (105). The foreground pixels in the tri-map (107) form the foreground region and the background pixels in the tri-map (107) form the background region. The tri-map (107) shown in FIG. 4F is generated by the image processing unit corresponding to the confidence map (105) shown in FIG. 4E.

Figure 4F:
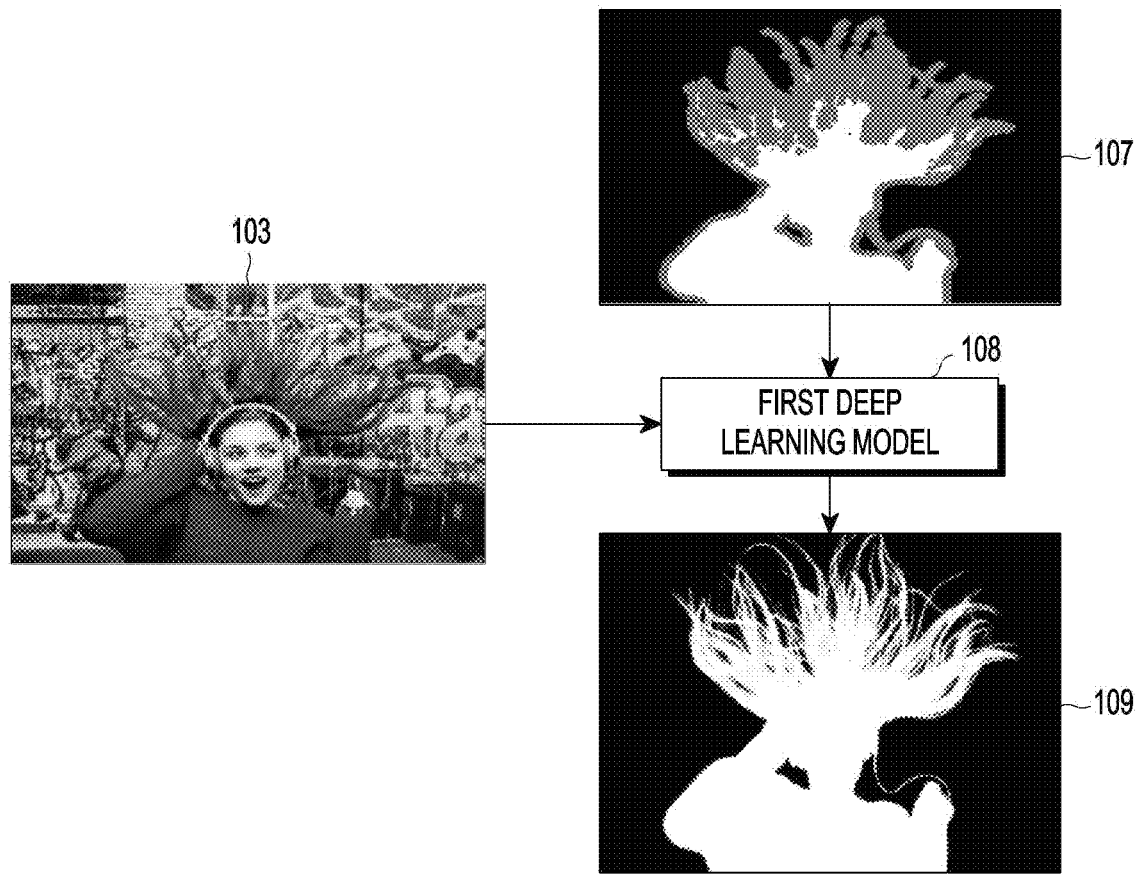
FIG. 4F shows an exemplary alpha matte generated from a tri-map for an image according to an embodiment.

In an embodiment, the image processing system (102) performs the image matting by providing the image (103) and the tri-map (107) of the image (103) to the pre-trained first deep learning model as shown in FIG. 4F. Further, generating the alpha matte (109) of the image (103) using the output of the pre-trained first deep learning model as shown in FIG. 4F, wherein the foreground region and the background region in the image (103) is separated using the alpha matte (109). The pre-trained first deep learning model may be based on the encoder-decoder model, a convolution neural network, recurrent neural network and the like.

Figure 5:
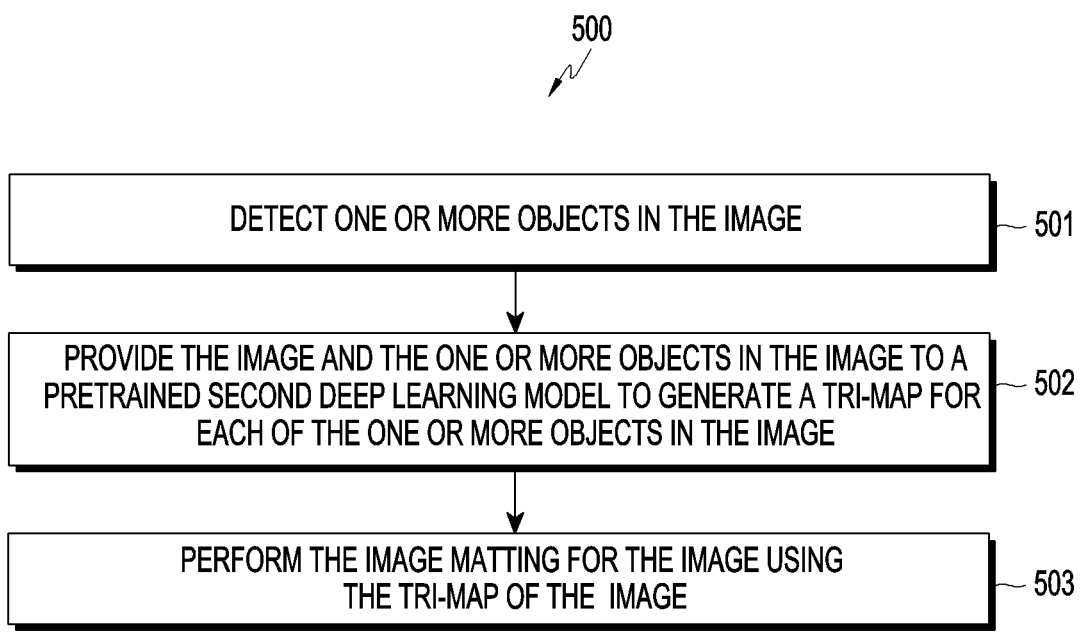
FIG. 5 shows a flowchart illustrating method steps for generating a tri-map for image matting using a second deep learning model according to an embodiment.

FIG. 5 shows a flowchart illustrating method of performing an image matting for an image (103) using a pre-trained second deep learning model according to an embodiment.

Figure 6:
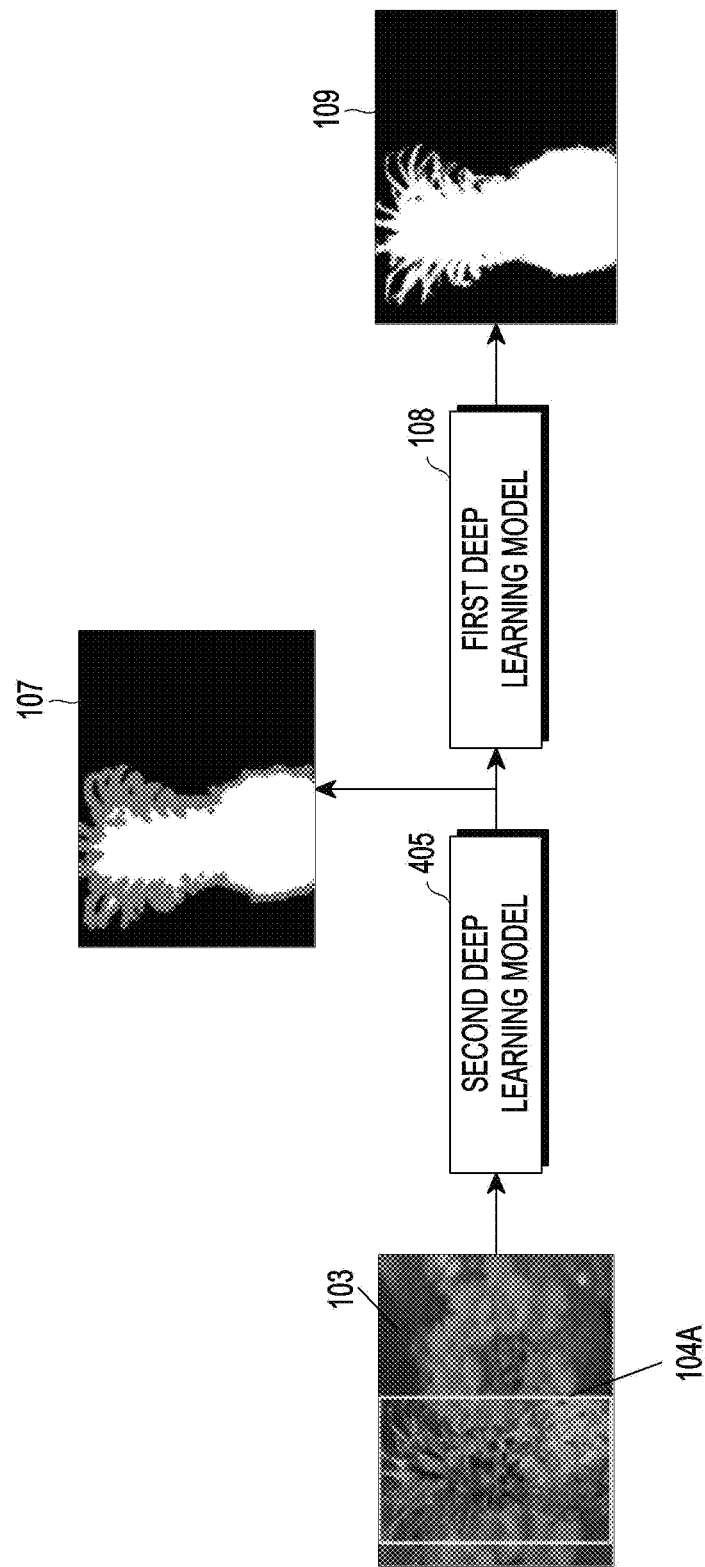
FIG. 6 shows an exemplary generation of a tri-map and an alpha matte for an image using second deep learning model and a first deep learning model according to an embodiment.

FIG. 6 shows an exemplary generation of a tri-map and an alpha matte for an image using second deep learning model and a first deep learning model according to an embodiment.

At operation 501, the image processing system (102) detects one or more objects (104) in the image (103). The detecting of the one or more objects (104) in the image (103) using the one or more object detection techniques is described in detail above in step 301 of FIG. 3.

At operation 502, the image processing system (102) provides the image (103) and the one or more objects (104) in the image (103) to the pre-trained second deep learning model to generate a tri-map (107) for each of the one or more objects (104) in the image (103). The pre-trained second deep learning model generates the tri-map (107) based on at least one of the size of the image (103) and the size of each of the one or more objects (104) in the image (103).

In an embodiment, the second deep learning model is based on an encoder-decoder model with skip connections. The image processing system (102) trains the second deep learning model by providing one or more sample images as an input to an initial deep learning model. Further, the image processing system (102) computes a loss value for the each pixel in the one or more sample images based on the output of the initial deep learning model using a loss function. The output indicates a label for the each pixel in the image (103). The label indicates at least one of the unknown pixel, the foreground pixel, or the background pixel. The loss function may include at least one of a cross-entropy function, means-squared error function, or the like. The loss value indicates an error between the output of the initial deep learning model and an expected output. The expected output may be the alpha matte (109) associated with the one or more images determined by a user. Furthermore, the image processing system (102) aggregates the loss value based on the label associated with the each pixel in the one or more sample images. Thereafter, the image processing system (102) modifies at least one of one or more weights associated with the initial deep learning model using a supervised learning technique based on the aggregated loss value. Based on the modified one or more weights the second deep learning model learns to generate the tri-map (107) for the image (103) based on at least one of the size of the image (103) and the size of each of the one or more objects (104) in the image (103).

At operation 503, the image processing system (102) performs the image matting for the image (103) using the tri-map (107) of the image (103). The generation of the tri-map (107) using the pre-trained first deep learning model is described in detail above with respect to step 304 of FIG. 3. The image matting generates the alpha matte (109) of the image (103), wherein the foreground region and the background region in the image (103) is separated using the alpha matte (109).

According to a method for performing an image matting for an image (103), the image processing unit (102) may obtain output data, i.e., the alpha matte (109), the tri-map (107), the confidence map (105) of the image (103) by using image data (i.e., pixel values) as an input data for an artificial intelligence model. The artificial intelligence model may be obtained by training. That is, a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The method of generating the tri-map (107) to perform the image matting for the image (103) includes generating an adaptive tri-map (107) for each of the one or more objects (104) in the image (103) based on the size and the depth of the one or more objects (104) in the image (103). The transformation value (106) computed for each of the objects (104) from the one or more objects (104) reduces the unknown region in the tri-map (107) of the image (103). The first deep learning model produces high quality alpha matte (109), which may be used in portrait mode for bringing in finer details (hair strands, furs etc.) of the objects (104) in focus and producing DSLR like Bokeh effect. Further, the finer alpha matte (109) may be used to extract the one or more objects (104) in the image (103) and blend the one or more objects (104) naturally with different backgrounds. The generation of the alpha matte (109) does not require human interaction with the image (103) to mark the unknown region in the tri-map (107) for image matting. The alpha matte (109) is generated for low quality or low-resolution images captured by the mobile phone or smart phones. The alpha matte (109) may be used for 3D modelling of the one or more objects (104) in the image (103).

Figure 7:
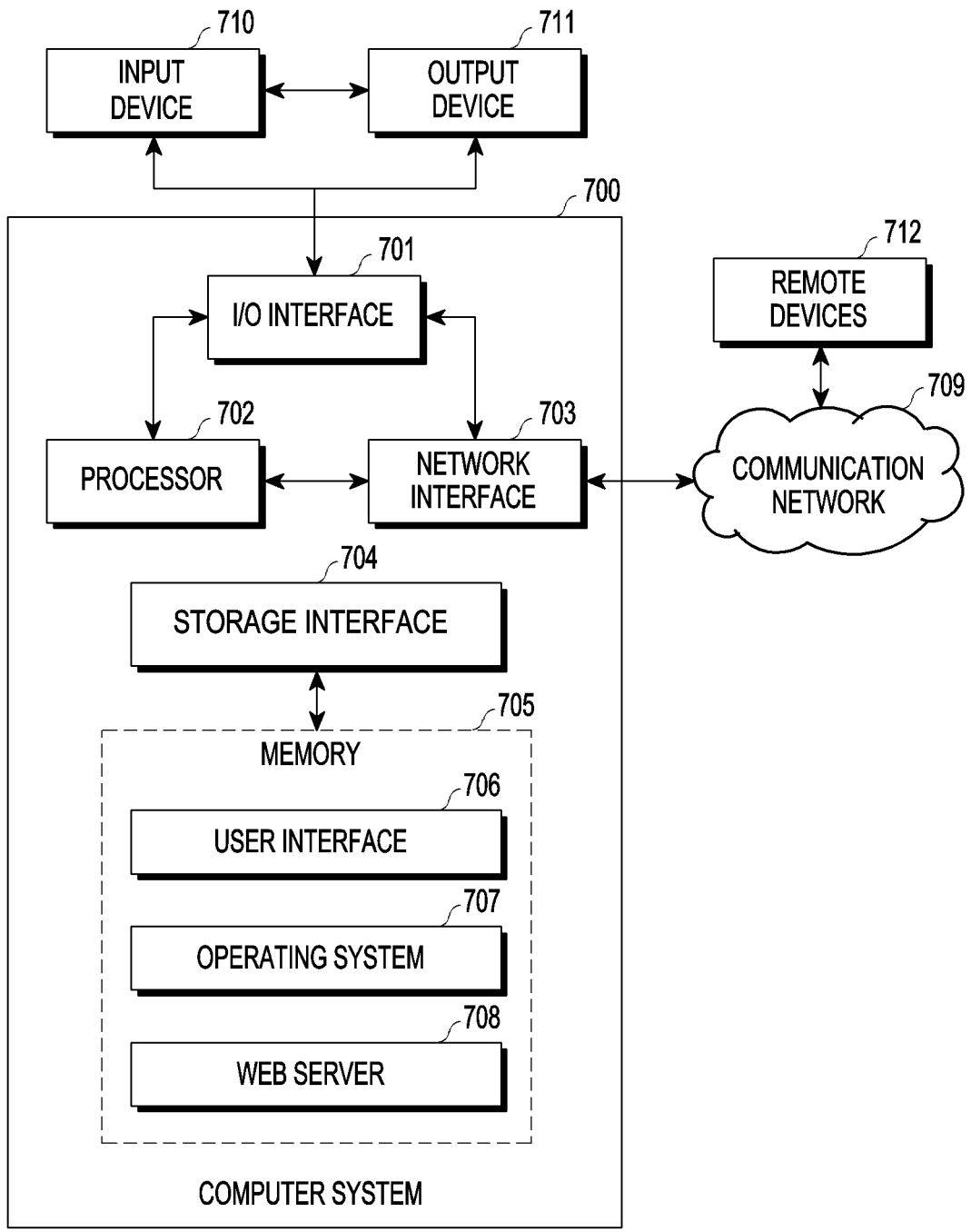
FIG. 7 shows a computer system for generating a tri-map for image matting according to an embodiment.

FIG. 7 illustrates a block diagram of an exemplary computer system (700) according to an embodiment. The computer system (700) may be used to implement the method of generating the tri-map (107) to perform the image matting. The computer system (700) may comprise a central processing unit ("CPU" or "processor") (702). The processor (702) may comprise at least one data processor for executing program components for monitoring physical fitness of a user. The processor (702) may include specialized processing units such as integrated system (bus) controllers, memory management control units, floating point units, graphics processing units, digital signal processing units, etc.

The processor (702) may be communicatively coupled with one or more input/output (I/O) devices via I/O interface (701). The I/O interface (701) may employ communication protocols/methods such as, without limitation, audio, analog, digital, monoaural, RCA connector, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface (701), the computer system (700) may communicate with one or more I/O devices. For example, the input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (711) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (700) is connected to the service operator through a communication network (709). The processor (702) may be connected to the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (709) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (703) and the communication network (709), the computer system (700) may communicate with the one or more service operators.

In some embodiments, the processor (702) may be communicatively coupled to a memory (705) (e.g., random access memory (RAM), ready-only memory (ROM), etc.) via a storage interface (704). The storage interface (704) may connect to memory (705) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, user interface (706), an operating system (707), web server (708), etc. In some embodiments, computer system (700) may store user/application data (706), such as the data, variables, records, etc. Such databases may be implemented as fault-tolerant, relational, scalable, secure databases such as Oracle or Sybase.

The operating system (707) may facilitate resource management and operation of the computer system (700). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (700) may implement a web browser stored program component. The web browser may be a hypertext viewing application, such as MICROSOFT® INTERNET EXPLORER®, GOOGLE™ CHROME', MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, HTML, ADOBE® FLASH®, JAVASCRIPT®, JAVA®, Application Programming Interfaces (APIs), etc. In some embodiments, the computer system (700) may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (700) may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage medium may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage medium.

The image (103) may be received from the remote devices (712) that are connected to the communication network (709).

The terms "an embodiment", "embodiment", "embodiments", "the embodiment", "the embodiments", "one or more embodiments", "some embodiments", and "one embodiment" mean "one or more (but not all) embodiments of the disclosure" unless explicitly indicated otherwise.

The terms "including", "comprising", "having" and variations thereof mean "including but not limited to", unless explicitly indicated otherwise.

The enumerated listing of items does not imply that any or all of the items are mutually exclusive, unless explicitly indicated otherwise. The terms "a", "an" and "the" mean "one or more", unless explicitly indicated otherwise.

Singular expressions may include plural expressions unless the context clearly indicates otherwise.

When a single device or article is described herein, it may be readily apparent that more than one device/article (whether or not they cooperate) may be used in place of a single device/article. Similarly, where more than one device or article is described herein, it may be readily apparent that a single device/article may be used in place of the more than one device or article or a different number of devices/articles may be used instead of the shown number of devices or programs. The functionality and/or the features of a device may be differently embodied by one or more other devices.

The operations of FIG. 3 and FIG. 5 shows certain events occurring in a certain order. In some embodiments, certain operations may be performed in a different order, modified, or removed. Moreover, various operations may be added to the embodiments described with reference to FIGS. 3 and 5. Further, operations described herein may be processed sequentially or may be processed in parallel. Also, operations may be performed by a single processing unit or by distributed processing units.

The embodiments of the disclosure have been shown and described above, however, the embodiments of the disclosure are not limited to the foregoing specific embodiments, and it is apparent that various modifications, substitutions, and improvements may be made by one of ordinary skill in the art in the technical field to which the disclosure belongs, without departing from the scope of the disclosure. Also, it should be understood that such modifications, substitutions, and improvements shall fall within the protection scope of the disclosure, and should not be construed independently from the technical idea or prospect of the disclosure.

What is claimed is:

1. A method of performing an image matting on an image, the method comprising:
   detecting, by an image processing system, one or more objects in the image;
   determining, by the image processing system, a confidence map associated with the image using one or more image segmentation techniques for each of the one or more objects; and
   generating, by the image processing system, a tri-map for each of the one or more objects in the image from the confidence map based on a distance between a first pixel in the image and a second pixel in an at least one of the one or more objects in the image,
   wherein the generating the tri-map for each of the one or more objects in the image further comprises:
      comparing the distance between the first pixel in the image and the second pixel in the at least one of the one or more objects in the image with a transformation value corresponding to each of the one or more objects; and
      labelling the first pixel as an unknown pixel based on the distance being less than the transformation value, or labelling the first pixel as at least one of a foreground pixel or a background pixel using the confidence map based on the distance being greater than or equal to the transformation value, and
   wherein the tri-map is used to perform the image matting.

2. The method according to claim 1, wherein the detecting the one or more objects in the image comprises identifying the one or more objects in the image using one or more object detection techniques.

3. The method according to claim 2, wherein the one or more object detection techniques comprise at least one of a bounding box technique using machine learning based viola-jones object detection framework using haar features, a scale-invariant feature transform (SIFT), a histogram of oriented gradient (HOG) features, a deep learning based region proposal, a single-shot refinement neural network for object detection, or a single-shot multi-box detector.

4. The method according to claim 1, wherein the determining the confidence map comprises:

computing the confidence map for the one or more objects in the image based on at least one of a pre-trained deep learning model, a depth sensor, or a Time of Flight (TOF) sensor; and modifying the confidence map using a color similarity based boundary correction technique.

5. The method according to claim 1, wherein the performing the image matting comprises:

providing the image and the tri-map of the image to a first pre-trained deep learning model; and generating an alpha matte of the image, wherein a foreground and a background in the image is separated using the alpha matte.

6. The method according to claim 1, wherein the second pixel in the at least one of the one or more objects in the image is determined based on a bounding box applied to each of the one or more objects in the image, and wherein the second pixel is located at a center of the bounding box.

7. The method according to claim 1, wherein the generating the tri-map for each of the one or more objects in the image comprises generating the tri-map using morphological operations, and wherein kernel size of the morphological operations are determined based on a ratio of a size of the image to the size of each of the one or more objects in the image.

8. An image processing system for performing an image matting on an image, the image processing system comprising:

a memory; and a processor configured to:

detect one or more objects in the image;

determine a confidence map associated with the image using one or more image segmentation techniques for each of the one or more objects; and generate a tri-map for each of the one or more objects in the image from the confidence map based on a distance between a first pixel in the image and a second pixel in an at least one of the one or more objects in the image, wherein the processor is further configured to:

compare the distance between the first pixel in the image and the second pixel in the at least one of the one or more objects in the image with a transformation value corresponding to each of the one or more objects; and label the first pixel as an unknown pixel based on the distance being less than the transformation value, or label the first pixel as at least one of a foreground pixel or a background pixel using the confidence map based on the distance being greater than or equal to the transformation value, wherein the tri-map is used to perform the image matting.

9. The image processing system according to claim 8, wherein the processor is further configured to identify the one or more objects in the image using one or more object detection techniques.

10. The image processing system according to claim 8, wherein the processor is further configured to:

compute the confidence map for the one or more objects in the image based on at least one of a pre-trained deep learning model, a depth sensor, or a Time of Flight (TOF) sensor; and modify the confidence map using a color similarity based boundary correction technique.

11. The image processing system according to claim 8, wherein the processor is further configured to:

provide the image and the tri-map of the image to a first pre-trained deep learning model; and generate an alpha matte of the image, wherein a foreground and a background in the image is separated using the alpha matte.

* * * * *